H. A. ABEL.
BRAKE GOVERNOR.
APPLICATION FILED MAR. 31, 1914.
1,122,225.
Patented Dec. 22, 1914.
2 SHEETS—SHEET 1.
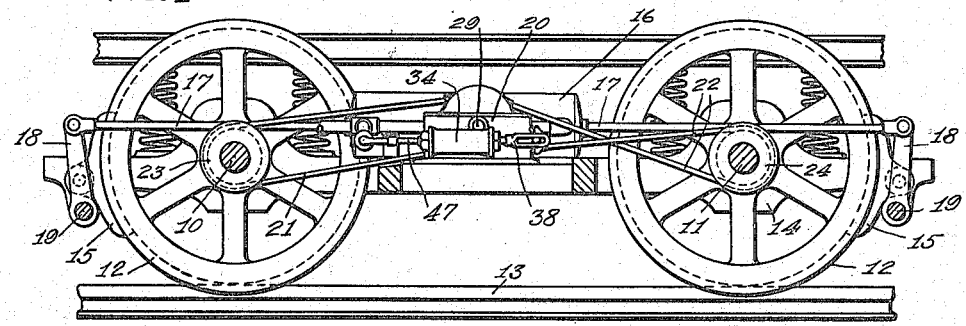
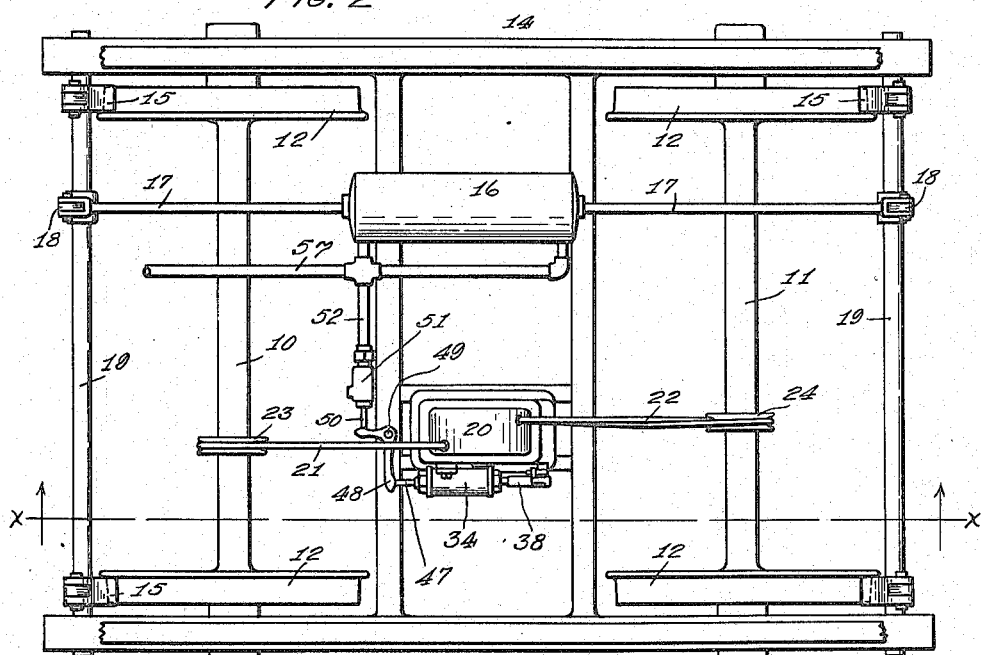
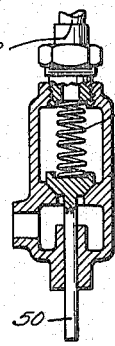
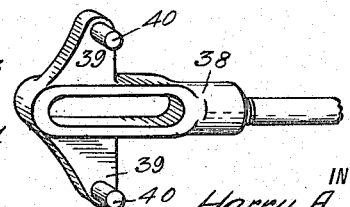
WITNESSES:
F. C. Matheny
O. Johnson
INVENTOR
Harry A. Abel
BY
C. D. Haskins
ATTORNEY

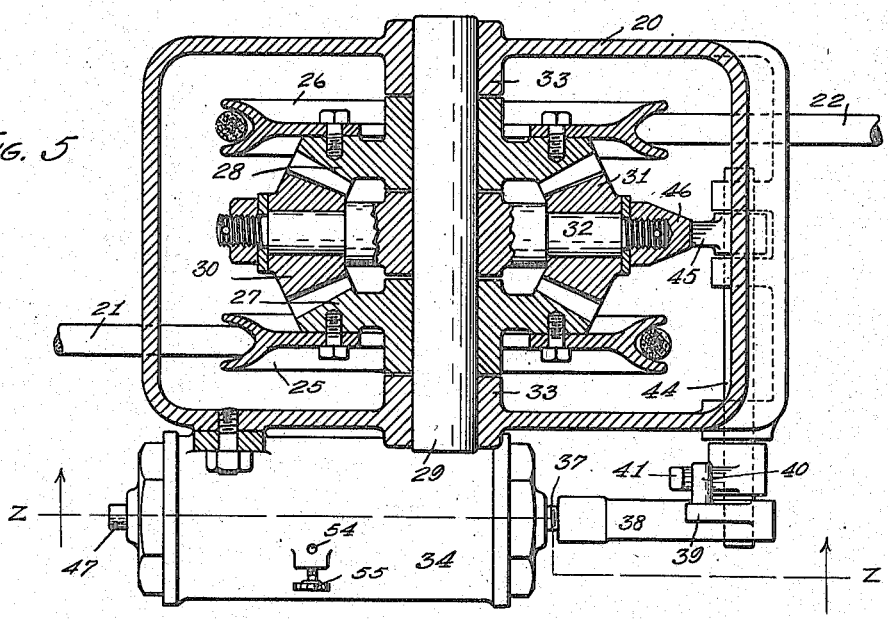
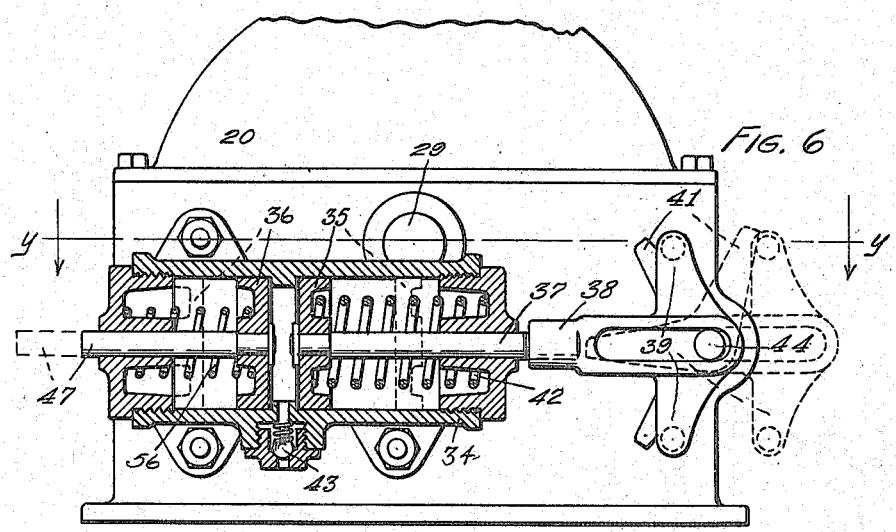
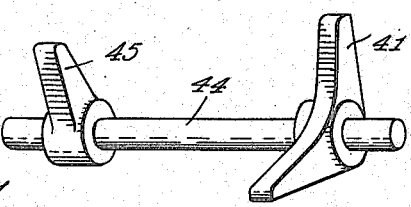

UNITED STATES PATENT OFFICE.

HARRY A. ABEL, OF SEATTLE, WASHINGTON.

BRAKE-GOVERNOR.

1,122,225.

Specification of Letters Patent.

Patented Dec. 22, 1914.

Application filed March 31, 1914. Serial No. 828,463.

*To all whom it may concern:*

Be it known that I, HARRY A. ABEL, citizen of the United States, residing at Seattle, in the county of King and State of Washington, have invented a certain new and useful Improvement in Brake-Governors, of which the following is a specification.

My invention relates to improvements in devices for governing the brake mechanism associated with the wheels of railroad cars and more particularly it relates to improved means for preventing the interruption of the rotary motion of the wheels of a moving railroad car in response to the application of air actuated brakes which interruption if not prevented would cause such wheels to slide on the track-rails and thus by attrition produce flat surfaces upon the peripheries of the wheels, and the object of my invention is to prevent the flattening of car wheels by providing a device that will release the air pressure governing the wheel brakes on a car truck as soon as any of the wheels on such truck cease rotating and begin to slide on the track thus permitting such wheels to resume their rotations to cause equal wear throughout their peripheries. I accomplish this object by devices illustrated in the accompanying drawings in which—

Figure 1 is a view in vertical section on broken line $x$, $x$ of Fig. 2, of a car truck to which my invention has been applied certain parts being shown in side elevation; Fig. 2 is a plan view of the same; Fig. 3 is a view in vertical section of a valve embodied in my invention; Fig. 4 is an enlarged view in perspective of a detail of my invention; Fig. 5 is a view in cross-section on broken line $y$, $y$ of Fig. 6, of a differential gear and associated mechanism embodied in my invention; Fig. 6 is a view in cross-section on broken line $z$, $z$ of Fig. 5, one position that certain parts may assume being shown by broken lines, and Fig. 7 is an enlarged view in perspective of a detail of my invention.

When brakes are applied to the wheels of a moving car with sufficient force to stop their rotation such car will not be stopped more quickly than when such brakes are applied with such slightly less force as will permit such wheels to continue to rotate and if such wheels are locked and caused to slide on the rails of a railroad track then the abrasion due to such sliding will quickly wear a flat surface on that portion of the periphery of the car wheel that is in contact with the rail and such flat surface by bumping on the rail when the wheel again begins to rotate will render impractical the use of the car on which the wheel is mounted until such wheel is again turned to a true circle or replaced by a new wheel.

It is the purpose of my invention to provide a device whereby if the brakes be set with sufficient force to cause any of the wheels connected therewith to slide it will automatically release a portion of the air from the pressure pipes or pressure cylinder and thus cause the brakes to be released before damage is done to the periphery of the wheel.

Referring to the drawings, throughout which like reference numerals indicate like parts, 10 and 11 are two axles of a car truck which axles are provided on each end with wheels 12, 12 that are secured thereto and adapted to roll on rails 13 when the truck is moved, the axles 10 and 11 being journaled in any suitable frame, as frame 14, and the wheels 12, 12 being each provided with a brake shoe 15 that is adapted to be moved by the pressure of air-actuated pistons (not shown) in an air cylinder 16 which pistons are connected by brake rods 17, 17 and lever arms 18, 18 with shafts 19, 19 to which the brake shoes 15, 15 are secured, as more clearly shown in Figs. 1 and 2, the axles 10 and 11 being adapted to rotate synchronously under normal conditions of operation.

In order that variation in the rate of speed between the axles 10 and 11 (such as would be occasioned by the slipping on rails 13) may act to release the pressure of air in the air cylinder 16, I have caused a differential gear box 20 to be associated with the car truck and the gear within the gear box to be connected with the axles 10 and 11 respectively, by belts 21 and 22 such belts passing around grooved pulleys 23 and 24 on the axles 10 and 11 and thence around other grooved pulleys 25 and 26 within the gear box that are connected with the larger bevel gearwheels 27 and 28 respectively, of a differential gear, such larger gearwheels 27 and 28 being mounted to rotate on a shaft 29 and adapted to mesh with other smaller bevel gearwheels 30 and 31 which are rotatably mounted on the two ends of a spider shaft 32 that is adapted to rotate about the shaft 29, such shaft 29 being journaled in bearings 33, 33 provided in the gear box 20, and one of the belts 22 being crossed, as shown in Fig. 1, whereby when the car truck is moved along the rails 13 the belts 21 and 22 will operate to rotate the gearwheel 27 in one direction and the gearwheel 28 in an opposite direction whereby if such two wheels 27 and 28 be rotating at the same rate of speed there will be a resultant rotation of the gearwheels 30 and 31 about the crank 32 only, but if the gearwheels 27 and 28 be rotating at a different rate of speed there will be a resultant rotation of the gearwheels 30 and 31 on their bearings and also a rotation of the shaft 32 about the shaft 29 or a rotation of such shaft 29 in its bearings if the shaft 32 be secured thereto.

Secured to one side of the gear box 20 is a cylinder 34 within which are disposed two pistons 35 and 36, the piston 35 being provided with a piston rod 37 that extends outwardly through one end of the cylinder 34 and connects with a slotted member 38 (more clearly shown in Fig. 4) that is provided on its outer end with two oppositely disposed transversely projecting arms 39, 39 upon the ends of which are formed studs 40, 40 that are adapted to be engaged by a bell crank shaped member 41 to move the member 38 backwardly, as shown in Fig. 6, and thereby to move the piston 35 toward the end of the cylinder 34 against the pressure of a helical compression spring 42 such piston 35 in its outward movement drawing air into the cylinder 34 through a check valve 43.

The bell crank 41 is secured to a shaft 44 that is journaled in brackets provided in the gear box 20 and is adapted to extend outwardly through the side of such gear box, as more clearly shown in Fig. 5, the outer end of such shaft 44 serving as a stud upon which the slotted member 38 may move, and the inner end of such shaft being provided with a fixedly secured arm 45 that is adapted to be engaged by a lug 46 that is provided on the end of the shaft 32, whereby when the shaft 32 swings about the shaft 29 the lug 46 may strike the arm 45 to turn the shaft 44 through a part of a revolution and cause the bell crank member 41 to engage with one of the studs 40 to move the piston 35 toward the end of the cylinder thus drawing in air through the check valve 43 and compressing the spring 42 which spring 42 when the pressure of the bell crank 41 is released will act to compress the air that has been drawn in through the check valve 43 and move the piston 36 against the pressure of a lighter helical compression spring 56 toward the other end of such cylinder 34, thus causing a piston rod 47 that is secured to the piston 36 to press against one end of a bell crank lever 48 which is fulcrumed on a pin 49 and causing the other end of such bell crank lever 48 to press against the stem 50 of a valve 51 which is connected by a pipe 52 with the air cylinder 16 to open such valve 51 and relieve the pressure within the cylinder 16, the valve 51 being provided with a spring 53 that is adapted to close such valve as soon as the pressure within the cylinder 34 is released.

The cylinder 34 is provided on one side with a perforation 54 through which air that may be compressed within such cylinder may slowly escape, the area of such perforation being regulated by screwing inwardly or outwardly a thumb screw 55 that may be provided in a suitable lug formed on the outside of the cylinder 34, as more clearly shown in Fig. 5.

While I have shown my invention as applied only to one form of car truck and as connected with an air cylinder that is located on such car truck it is obvious that such invention in substantially the same form may be associated with any standard form of car truck and may be connected by suitable pipes with any air cylinder or air passageway that is located at any point whereby air pressure within said passageway or cylinder may be relieved.

When the car truck herein described is moved over a railroad the axles 10 and 11 are caused to rotate in the same direction at approximately the same speed and such axles operate through the belts 21 and 22, the latter of which is shown to be a crossed belt, to rotate the gearwheels 27 and 28 in opposite directions thus rotating the pinions 30 and 31 on the shaft 32 while such shaft 32 remains in a fixed position but if the brakes 15 be set by admitting air under pressure to the cylinder 16 through a supply pipe 57, with sufficient force to cause the wheels 12, 12 on either one of the axles 10 or 11 to slide on the rail then the shaft 32 will begin to revolve about the center of the shaft 29 and the lug 46 will engage with the arm 45 and turn the shaft 44 through a part of a revolution thus causing the outer surface of the bell crank 41 to engage one of the studs 40 and by moving the member 38 into the position shown by broken lines in Fig. 6, will move the piston 35 toward the end of the cylinder 34 thus drawing in a change of air through the check valve 43 and when the lug 46 passes and releases the arm 45 then the spring 42 will act to quickly replace the piston 35 into the position shown by full lines in Fig. 6, thus compressing the air that has been drawn into such cylinder against the piston 36 and moving such piston 36 outwardly, as shown by broken lines in Fig. 6. When the piston rod 47 is thrust outwardly it will act through the bell crank 48 to open the valve 51 and relieve the pressure of the air within the cylinder 16 which has been used to set the brakes 15 thus releasing the pressure of such brakes sufficiently to permit the wheels that have started to slide to again roll on the rails 13, the compressed air within the cylinder 34 passing slowly out through the perforation 54 and permitting the valve 51 slowly to close which valve may again be opened to relieve more pressure by the next revolution of the shaft 32.

Manifestly numerous changes may be made in the various mechanical parts embodied in my device without departing from the spirit of my invention or sacrificing any of its advantages.

What I claim is:

1. In a device for governing the pressure of air brakes, the combination with two shafts that are adapted to rotate at the same rate of speed, of air controlled brakes associated with said shafts, and mechanism connected with said shafts to release said brakes in response to a change in the rotary velocity of one of said shafts with respect to the rotary velocity of the other of said shafts.

2. In a device for governing the pressure of air brakes, the combination with the two axles and associated wheels of a car truck, of air controlled brakes associated with said wheels, and a differential gear connected with both of said axles and adapted, when said car truck is in motion, to release said brakes in response to a change in the rotary velocity of one of said axles with respect to the rotary velocity of said other axle.

3. In a device for governing the pressure of air brakes, the combination with the two axles and associated wheels of a car truck, of brake shoes, air controlled mechanism for pressing said brake shoes against said wheels, a differential gear and belts connecting said differential gear with each of said axles.

4. In a device for governing the pressure of brakes, the combination with the axles and wheels of a car truck, of brakes for said wheels, a fluid pressure cylinder, mechanism for operating said brakes by the admission of compressed fluid into said cylinder, a differential gear having a movable lug therein, a valve connected with said pressure cylinder, belts connecting said differential gear with both of said axles whereby when said axles rotate in the same direction and at the same rate of speed said lug shall not be movable but when said shafts rotate at different rates of speed said lug shall move, and mechanism connecting said valve and said differential gear whereby when said lug moves it shall open said valve to reduce the pressure of the fluid within said cylinder to release said brakes.

5. In a device for governing the pressure of air brakes, the combination with two shafts that are normally adapted to rotate at the same rate of speed, of brakes associated with said shafts, a cylinder for compressed air, mechanism for applying said brakes in response to the admission of compressed air into said cylinder, a valve, a differential gear, mechanism connecting said valve and said differential gear, and belts connecting said differential gear with each of said shafts, whereby a change in the velocity of rotation of one of said shafts with respect to the velocity of rotation of the other of said shafts, due to the application of said brakes, shall open said valve to lower the air pressure within said cylinder and release said brakes.

6. In a device for governing the pressure of air brakes, the combination with two shafts that are adapted to be rotated at the same rate of speed, of brakes associated with said shafts, a cylinder for compressed air, mechanism for applying said brakes in response to the admission of compressed air into said cylinder, a gear box, a shaft journaled in said gear box and extending crosswise thereof, gearwheels mounted on said shaft, belt pulleys secured to said gearwheels, a spider shaft disposed at right angles to said first named shaft and adapted to rotate thereon, said spider shaft having a gearwheel mounted on both ends thereof and disposed to mesh with said first named gearwheels, a lug disposed on the end of said spider shaft, a shaft provided with a bell crank and with an arm that is disposed to be engaged by said lug, a cylinder, spring pressed pistons disposed in said cylinder, said pistons having piston rods that are adapted to extend outwardly through the ends of said cylinder, studs associated with the end of one of said piston rods and disposed to be engaged by said bell crank to move said piston, a valve connected with said compressed air cylinder, mechanism connecting said valve with the other of said piston rods, and belts connecting said belt pulleys with said shafts whereby a change in the direction of rotation or relative speed of rotation of one of said shafts with respect to the other of said shafts shall cause said lug to engage with said arm to move said pistons and open said valve to reduce the pressure of air within said compressed air cylinder to release said brakes.

In witness whereof, I hereunto subscribe my name this 21st day of March A. D., 1914.

HARRY A. ABEL.

Witnesses:
FRANK WARREN,
O. JOHNSON.